(12) United States Patent
Sealey et al.

(10) Patent No.: US 8,014,499 B2
(45) Date of Patent: *Sep. 6, 2011

(54) ARRANGEMENT IN A LOCAL COMPUTER FOR SENDING VOICE MESSAGES TO A UNIFIED COMMUNICATIONS SYSTEM

(75) Inventors: Robert Raymond Sealey, Brighton (AU); David S. Gress, Mechanicsville, VA (US)

(73) Assignee: Cisco Technology, Inc., San Jose, CA (US)

( * ) Notice: Subject to any disclaimer, the term of this patent is extended or adjusted under 35 U.S.C. 154(b) by 864 days.

This patent is subject to a terminal disclaimer.

(21) Appl. No.: 11/354,892

(22) Filed: Feb. 16, 2006

(65) Prior Publication Data

US 2006/0140359 A1    Jun. 29, 2006

Related U.S. Application Data

(63) Continuation of application No. 09/771,926, filed on Jan. 30, 2001, now Pat. No. 7,023,970.

(51) Int. Cl.
*H04M 11/00* (2006.01)
*H04M 1/64* (2006.01)

(52) U.S. Cl. ............... 379/88.17; 379/88.13; 379/88.23

(58) Field of Classification Search .............. 379/88.17, 379/88.13, 88.23
See application file for complete search history.

(56) References Cited

U.S. PATENT DOCUMENTS

| | | | | |
|---|---|---|---|---|
| 4,612,416 A | * | 9/1986 | Emerson et al. ............ | 379/88.18 |
| 4,646,346 A | * | 2/1987 | Emerson et al. .......... | 379/214.01 |
| 4,837,798 A | * | 6/1989 | Cohen et al. ............... | 379/88.14 |
| 5,008,926 A | * | 4/1991 | Misholi ...................... | 379/88.13 |
| 5,029,199 A | * | 7/1991 | Jones et al. ................ | 379/88.26 |
| 5,260,990 A | * | 11/1993 | MeLampy et al. .......... | 379/88.26 |
| 5,406,557 A | * | 4/1995 | Baudoin ...................... | 370/407 |
| 5,479,411 A | * | 12/1995 | Klein ......................... | 379/93.14 |
| 5,493,607 A | * | 2/1996 | Arumainayagam et al. .......................... | 379/88.19 |
| 5,524,137 A | * | 6/1996 | Rhee ......................... | 379/88.01 |
| 5,524,139 A | * | 6/1996 | Jones ......................... | 379/88.25 |
| 5,526,353 A | * | 6/1996 | Henley et al. ............... | 370/392 |
| 5,530,740 A | * | 6/1996 | Irribarren et al. .......... | 379/88.17 |
| 5,537,461 A | * | 7/1996 | Bridges et al. ............. | 379/88.17 |
| 5,557,659 A | * | 9/1996 | Hyde-Thomson ......... | 379/88.13 |
| 5,568,540 A | * | 10/1996 | Greco et al. ............... | 379/88.25 |
| 5,604,803 A | * | 2/1997 | Aziz ............................ | 713/155 |
| 5,608,786 A | * | 3/1997 | Gordon ....................... | 370/352 |
| 5,625,775 A | * | 4/1997 | Davis et al. .................. | 709/227 |
| 5,630,060 A | * | 5/1997 | Tang et al. .................. | 709/238 |
| 5,647,002 A | * | 7/1997 | Brunson ...................... | 709/206 |
| 5,675,507 A | * | 10/1997 | Bobo, II ..................... | 709/206 |
| 5,737,395 A | * | 4/1998 | Irribarren .................. | 379/88.13 |
| 5,740,231 A | * | 4/1998 | Cohn et al. ................. | 379/88.22 |

(Continued)

OTHER PUBLICATIONS

U.S. Appl. No. 09/459,926, filed Dec. 14, 1999, Dodrill et al.

(Continued)

*Primary Examiner* — Joseph T Phan
(74) *Attorney, Agent, or Firm* — Leon R. Turkevich

(57) ABSTRACT

A user computer, for example a personal computer (PC), includes a recorder configured for generating an audio file having an identifier enabling a unified messaging system to identify the audio file as a voice message, and an e-mail client configured for sending the audio file to a prescribed destination corresponding to a unified messaging subscriber voice mail inbox, enabling the unified messaging subscriber to use the unified messaging system for retrieval of the audio file as a stored voice message.

9 Claims, 3 Drawing Sheets

U.S. PATENT DOCUMENTS

| | | | |
|---|---|---|---|
| 5,751,338 A * | 5/1998 | Ludwig, Jr. | 348/14.12 |
| 5,760,823 A * | 6/1998 | Brunson et al. | 348/14.06 |
| 5,764,731 A * | 6/1998 | Yablon | 379/88.15 |
| 5,799,063 A * | 8/1998 | Krane | 379/88.17 |
| 5,802,314 A * | 9/1998 | Tullis et al. | 709/246 |
| 5,828,736 A | 10/1998 | Chevion | |
| 5,931,917 A * | 8/1999 | Nguyen et al. | 709/250 |
| 5,991,365 A | 11/1999 | Pizano et al. | |
| 6,212,535 B1 | 4/2001 | Weikart et al. | |
| 6,233,318 B1 * | 5/2001 | Picard et al. | 379/88.17 |
| 6,301,245 B1 * | 10/2001 | Luzeski et al. | 370/352 |
| 6,304,636 B1 | 10/2001 | Goldberg et al. | |
| 6,341,160 B2 | 1/2002 | Tverskoy et al. | |
| 6,445,694 B1 | 9/2002 | Swartz | |
| 6,549,612 B2 | 4/2003 | Gifford et al. | |
| 6,650,737 B2 * | 11/2003 | Finnigan | 379/88.02 |
| 6,665,378 B1 | 12/2003 | Spielman et al. | |
| 6,766,298 B1 | 7/2004 | Dodrill et al. | |

OTHER PUBLICATIONS

Newton, Harry, *Newton's Telecom Dictionary*, 1998, Telecom Books, pp. 319 and 337.

\* cited by examiner

ARRANGEMENT IN A LOCAL COMPUTER FOR SENDING VOICE MESSAGES TO A UNIFIED COMMUNICATIONS SYSTEM

This application is continuation of application Ser. No. 09/771,926, filed Jan. 30, 2001 now U.S. Pat. No. 7,023,970.

BACKGROUND OF THE INVENTION

1. Field of the Invention

The present invention relates to a browser-based arrangement for recording and sending voice messages to a unified messaging system for storage in a unified message store.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

An open standards-based Internet protocol (IP) network, such as the World Wide Web, the Internet, or a corporate intranet, provides client-server type application services for clients by enabling the clients to request application services from remote servers using standardized protocols, for example hypertext transport protocol (HTTP). The web server application environment can include web server software, such as Apache, implemented on a computer system attached to the IP network. Web-based applications are composed of HTML pages, logic, and database functions. In addition, the web server may provide logging and monitoring capabilities.

In contrast to the public switched telephone network, the open standards-based IP network has enabled the proliferation of web based applications written by web application developers using ever increasing web development tools. Hence, the ever increasing popularity of web applications and web development tools provides substantial resources for application developers to develop robust web applications in a relatively short time and an economical manner. However, one important distinction between telephony-based applications and web-based applications is that telephony-based applications are state aware, whereas web-based applications are stateless.

In particular, telephony applications are state aware to ensure that prescribed operations between the telephony application servers and the user telephony devices occur in a prescribed sequence. For example, operations such as call processing operations, voicemail operations, call forwarding, etc., require that specific actions occur in a specific sequence to enable the multiple components of the public switched telephone network to complete the prescribed operations.

The web-based applications running in the IP network, however, are state-less and transient in nature, and do not maintain application state because application state requires an interactive communication between the browser and back-end database servers accessed by the browsers via a HTTP-based web server. However, an HTTP server provides asynchronous execution of HTML applications, where the web applications in response to reception of a specific request in the form of a URL from a client, instantiate a program configured for execution of the specific request, send an HTML web page back to the client, and terminate the program instance that executed the specific request. Storage of application state information in the form of a "cookie" is not practical because some users prefer not to enable cookies on their browser, and because the passing of a large amount of state information as would normally be required for voice-type applications between the browser and the web application would substantially reduce the bandwidth available for the client.

Commonly-assigned, copending application Ser. No. 09/480,485, filed Jan. 11, 2000, entitled Application Server Configured for Dynamically Generating Web Pages for Voice Enabled Web Applications, the disclosure of which is incorporated in its entirety herein by reference, discloses an application server that executes a voice-enabled web application by runtime execution of extensible markup language (XML) documents that define the voice-enabled web application to be executed. The application server includes a runtime environment that establishes an efficient, high-speed connection to a web server. The application server, in response to receiving a user request from a user, accesses a selected XML page that defines at least a part of the voice application to be executed for the user. The XML page may describe any one of a user interface such as dynamic generation of a menu of options or a prompt for a password, an application logic operation, or a function capability such as generating a function call to an external resource. The application server then parses the XML page, and executes the operation described by the XML page, for example dynamically generating an HTML page having voice application control content, or fetching another XML page to continue application processing. In addition, the application server may access an XML page that stores application state information, enabling the application server to be state-aware relative to the user interaction. Hence, the XML page, which can be written using a conventional editor or word processor, defines the application to be executed by the application server within the runtime environment, enabling voice enabled web applications to be generated and executed without the necessity of programming language environments.

Hence, web programmers can write voice-enabled web applications, using the teachings of the above-incorporated application Ser. No. 09/480,485, by writing XML pages that specify respective voice application operations to be performed. The XML documents have a distinct feature of having tags that allow a web browser (or other software) to identify information as being a specific kind or type of information. Hence, the XML documents define the application to be executed by the application server within the runtime environment, enabling voice enabled web applications to be generated and executed without the necessity of programming language environments.

Commonly-assigned, copending application Ser. No. 09/459,926, filed Dec. 14, 1999, entitled Apparatus and Method for Providing Browser Audio Control for Voice Enabled Web Applications, the disclosure of which is incorporated in its entirety herein by reference, describes a browser based arrangement for selectively executing audio operations specified by XML elements within a received HTML page, generated by the above-described application server. In particular, the application server generates the HTML page with XML tags that specify voice application control content; if the web browser does not have the necessary executable audio resource to execute the audio operations specified by the XML elements, the web browser ignores the XML elements and merely presents any other recognized HTML tags to the user. However if the web browser has access to an executable audio resource that understands the XML element, then the web browser executes the audio operation based on enhanced audio control specified by the XML element. Hence, a web browser can be used to provide enhanced control for voice enabled web applications generated by a server, merely by possession of an executable audio resource that recognizes the XML element that specifies the enhanced audio control required for the audio operation to be performed (e.g., record, post recorded message, playback).

The above-described arrangement for providing a web-based voice application, such as a voice messaging application, still assumes an interactive session in the form of HTTP requests and responses between the browser (which may be implemented as a proxy browser resident on an IP telephone) and the application server. Hence, if a user attempted to send a voice message without relying on the interactive session with the application server, for example by sending a MIME encoded .wav file by SMTP, the message would be stored as an e-mail message having a .wav attachment instead of a voice message recognizable by the unified communication system. Hence, a user such as a mobile user having a portable PC cannot leave a voice message for a unified messaging subscriber without interacting with a unified messaging server.

SUMMARY OF THE INVENTION

There is a need for an arrangement that enables a user to create a voice message for a unified messaging subscriber without relying on an interactive messaging session with a unified messaging server.

There also is a need for arrangement that enables a user to record a voice message using a PC, and to store the recorded voice message in a voice message box of a unified messaging subscriber, without relying on an interactive messaging session with a unified messaging server.

There is also a need for an arrangement that enables a user to locally record a voice message for a unified messaging subscriber, and forward the voice message for retrieval by the unified messaging subscriber, without the necessity of the user accessing a unified messaging server for generation or transfer of the voice message.

These and other needs are attained by the present invention, where a user computer, for example a personal computer (PC), includes a recorder configured for generating an audio file having an identifier enabling a unified messaging system to identify the audio file as a voice message, and an e-mail client configured for sending the audio file to a prescribed destination corresponding to a unified messaging subscriber voice mail inbox, enabling the unified messaging subscriber to use the unified messaging system for retrieval of the audio file as a stored voice message.

One aspect of the present invention provides a method in a user computer for sending a voice message. The method includes recording a voice message based on encoding parameters recognized by a voice messaging system, and storing the voice message within a data file having a selectable Multipurpose Internet Mail Extension (MIME) type recognizable by the voice messaging system as a voice message. The method also includes outputting the data file using a prescribed messaging protocol for transfer to a destination voice mailbox accessible by the voice messaging system for a corresponding voice messaging subscriber. Storing the voice message within a data file having a selectable MIME type recognizable by the voice messaging system as a voice message enables the data file to be recognized as a voice message by the voice messaging system, even if the data file is sent to a destination voice mailbox without use of a messaging session control by the voice messaging system. Hence, a user can record a voice message locally using his or her user computer, and forward the voice message using a prescribed messaging protocol, such as SMTP, to enable any voice messaging subscriber to retrieve the message as a voice mail message.

Another aspect of the present invention provides a user computer. The user computer includes a recorder configured for recording a voice message input by a user according to selected encoding parameters recognized by a voice messaging system, and storing the voice message as a data file having a selectable MIME type recognizable by the voice messaging system as a voice message. The user computer also includes an e-mail client configured for sending the data file to a destination voice mailbox, using a prescribed messaging protocol, enabling access by the voice messaging system for a corresponding voice messaging subscriber.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment is directed to utilizing an executable plug-in resource within a computer (e.g., a personal computer), enabling a user of the computer to encode a voice message into a data file and send the data file via a prescribed e-mail protocol such as SMTP. Moreover, the e-mail client is configured for sending the data file containing the voice message with a selected attachment type identifier that enables a unified communication system (or at least a voice messaging system) to recognize the data file as containing an encoded voice messaging. Hence, a user computer can be utilized for creating and sending a voice message to a voice messaging subscriber, without the necessity for the sender to interact with the unified messaging system in order to leave the message.

A description will first be given of the unified messaging architecture for use in storage and retrieval of unified messages including voice messages, followed by a detailed description of the arrangement for utilizing an executable plug-in resource enabling a user computer to record and output a voice message to a destination voice mailbox accessible by a unified messaging system for a messaging subscriber.

Figure 1:
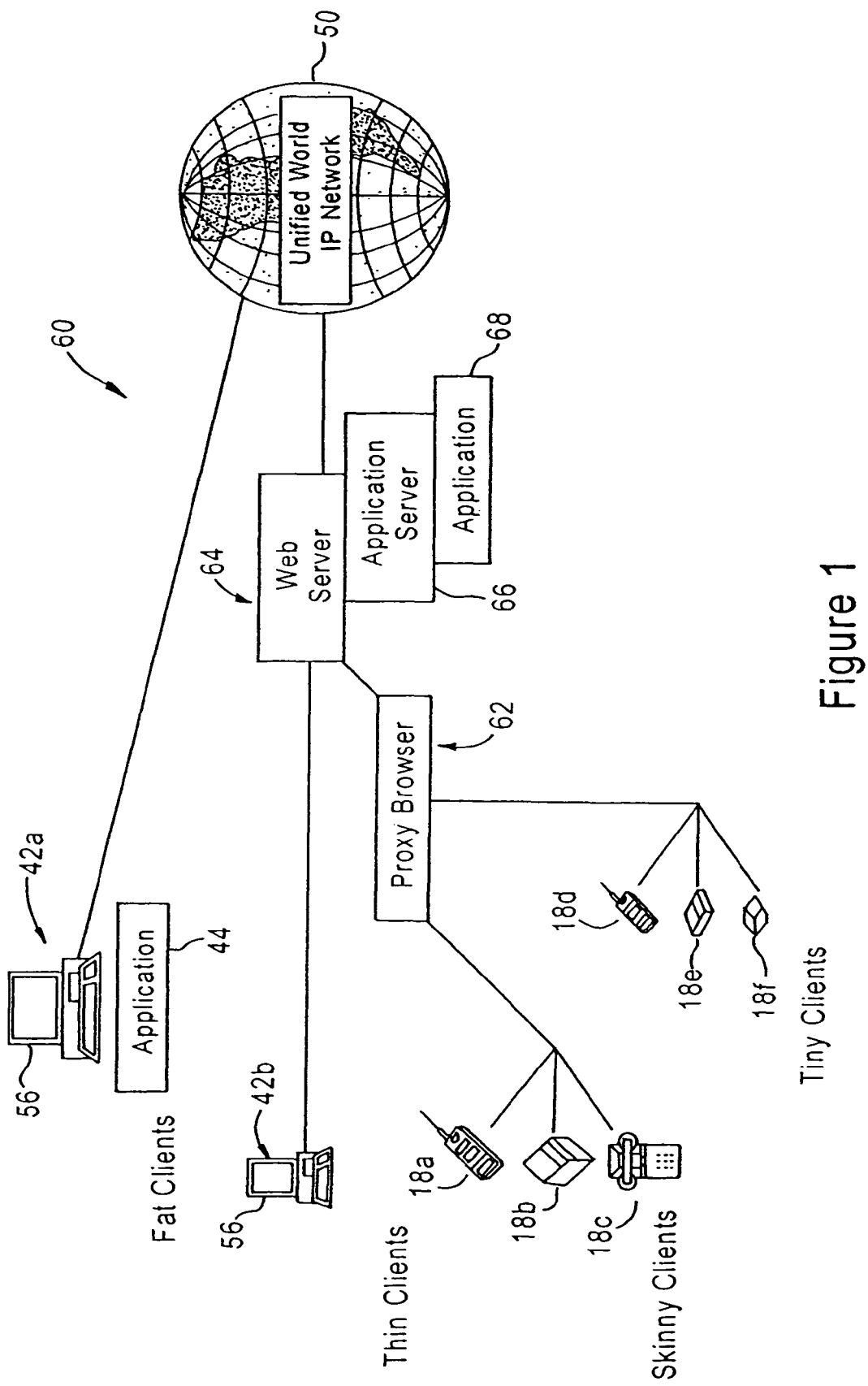
FIG. 1 is a block diagram illustrating an system enabling deployment of a unified messaging system, capable of executing voice enabled web applications, according to an embodiment of the present invention.
Figure 3:
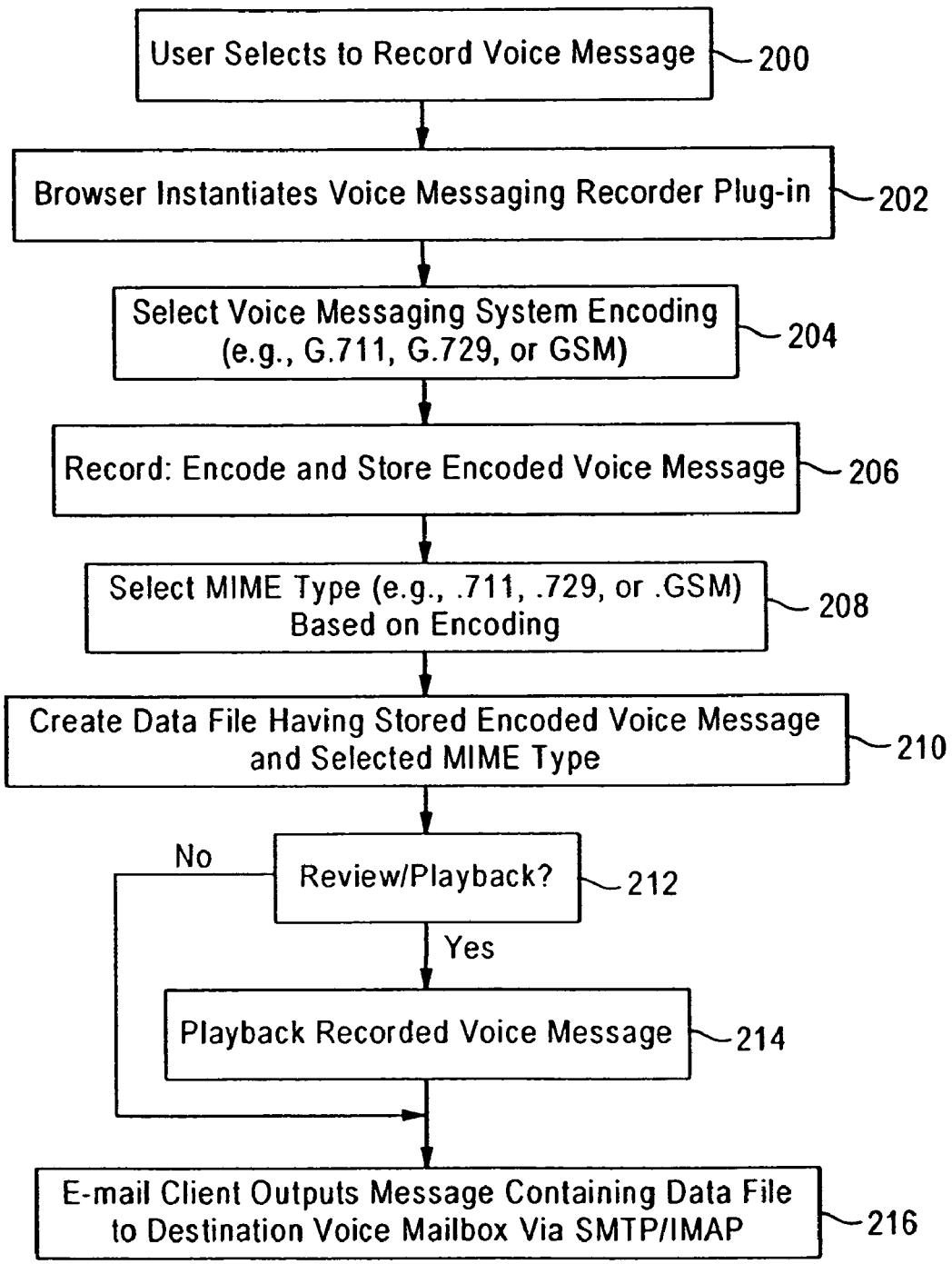
FIG. 3 is a diagram illustrating the method of locally generating and sending a voice message to a destination voice mailbox for retrieval by a unified messaging system according to an embodiment of the present invention.

FIG. 1 is a block diagram illustrating an architecture that provides unified voice messaging services and data services via an IP network using browser audio control according to an embodiment of the present invention, reproduced from FIG. 3 of the above-incorporated application Ser. No. 09/480,485. The clients 42a and 42b, referred to herein as "fat clients" and "thin clients", respectively, have the distinct advantage that they can initiate requests using IP protocol to any connected web server 64 to execute part or most of the applications 44 on behalf of the clients. An example of a fat client 42a is an e-mail application on a PC that knows how to run the application 44 and knows how to run the IP protocols to communicate directly with the messaging server via the packet switched network 50. An example of a thin client 42b is a PC that has a web browser; in this case, the web browser 56 can use IP protocols such as HTTP to receive and display web pages generated according to hypertext markup language (HTML) from server locations based on uniform resource locators (URLs) input by the user of the PC.

As shown in FIG. 1, each of the clients (tiny clients, skinny clients, thin clients and fat clients) are able to communicate via a single, unified architecture 60 that enables voice communications services between different clients, regardless of whether the client actually has browser capabilities. Hence, the fat client 42a and the thin client 42b are able to execute voice enabled web applications without any hardware modification or any modification to the actual browser; rather, the browsers 56 in the clients 42a and 42b merely are provided with an executable voice resource configured for providing browser audio control, described below.

The user devices 18a, 18b, and 18c, illustrated as a cordless telephone 18a, a fax machine 18b having an attached telephone, and an analog telephone 18c, are referred to herein as "skinny clients", defined as devices that are able to interface with a user to provide voice and/or data services (e.g., via a modem) but cannot perform any control of the associated access subnetwork.

The wireless user devices 18d, 18e, and 18f, illustrated as a cellular telephone (e.g., AMPS, TDMA, or CDMA) 18d, a handheld computing device (e.g., a 3-Com Palm Computing or Windows CE-based handheld device) 18e, and a pager 18f, are referred to as tiny clients. "Tiny clients" are distinguishable from skinny clients in that the tiny clients tend to have even less functionality in providing input and output interaction with a user, rely exclusively on the executable application in an access subnetwork to initiate communications; in addition, tiny clients may not be able to send or receive audio signals such as voice signals at all.

Hence, the skinny clients 18a, 18b, and 18c and the tiny clients 18d, 18e, and 18f access the unified voice messaging services in the unified network 60 via a proxy browser 62, configured for providing an IP and HTTP interface for the skinny clients and the tiny clients. In particular, browsers operate by interpreting tags within a web page supplied via an HTTP connection, and presenting to a user media content information (e.g., text, graphics, streaming video, sound, etc.) based on the browser capabilities; if a browser is unable to interpret a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18a and telephone 18c would receive analog audio signals played by the proxy browser 62 and no text information (unless a display is available); the fax machine 18b and pager 18f would only receive data/text information, and the cellular telephone 18d and the handheld computing device 18e would receive both voice and data information. Hence, the proxy browser 62 interfaces between the IP network and the respective local access devices for the skinny clients and the tiny clients to provide access to the unified messaging network 60.

The proxy browser 62 and the web browsers 56 within the fat client 42a and the thin client 42b execute voice enabled web applications by sending data and requests to a web server 64, and receiving hypertext markup language (HTML) web pages from the web server 64, according to hypertext transport protocol (HTTP). The web server 64 serves as an interface between the browsers and an application server 66 that provides an executable runtime environment for XML voice applications. The application server 66, in response to receiving a request from the web server 64, may either supply the requested information in the form of an HTML page having XML tags for audio control by a voice resource within the browser, or may perform processing and return a calculated value to enable the browser 56 or 62 to perform additional processing.

The application server 66 accesses selected stored XML application pages (i.e., XML pages that define an application) and in response generate new HTML pages having XML tags during runtime and supply the generated HTML pages having XML tags to the web server 64. Since multiple transactions may need to occur between the browser 56 or 62 and the application server 66, the application server 66 is configured for storing for each existing user session a data record, referred to as a "brownie", that identifies the state of the existing user session; hence, the application server 66 can instantiate a procedure, return the necessary data, and terminate the procedure without the necessity of maintaining the instance running throughout the entire user session.

Hence, the application server 66 executes voice application operations from a stored XML document based on a transient application state, where the application server 66 terminates the application instance after outputting the generated XML media information to the browser 18 or 42. Additional details describing the application server 66 are in the above-incorporated application Ser. No. 09/480,485.

Figure 2:
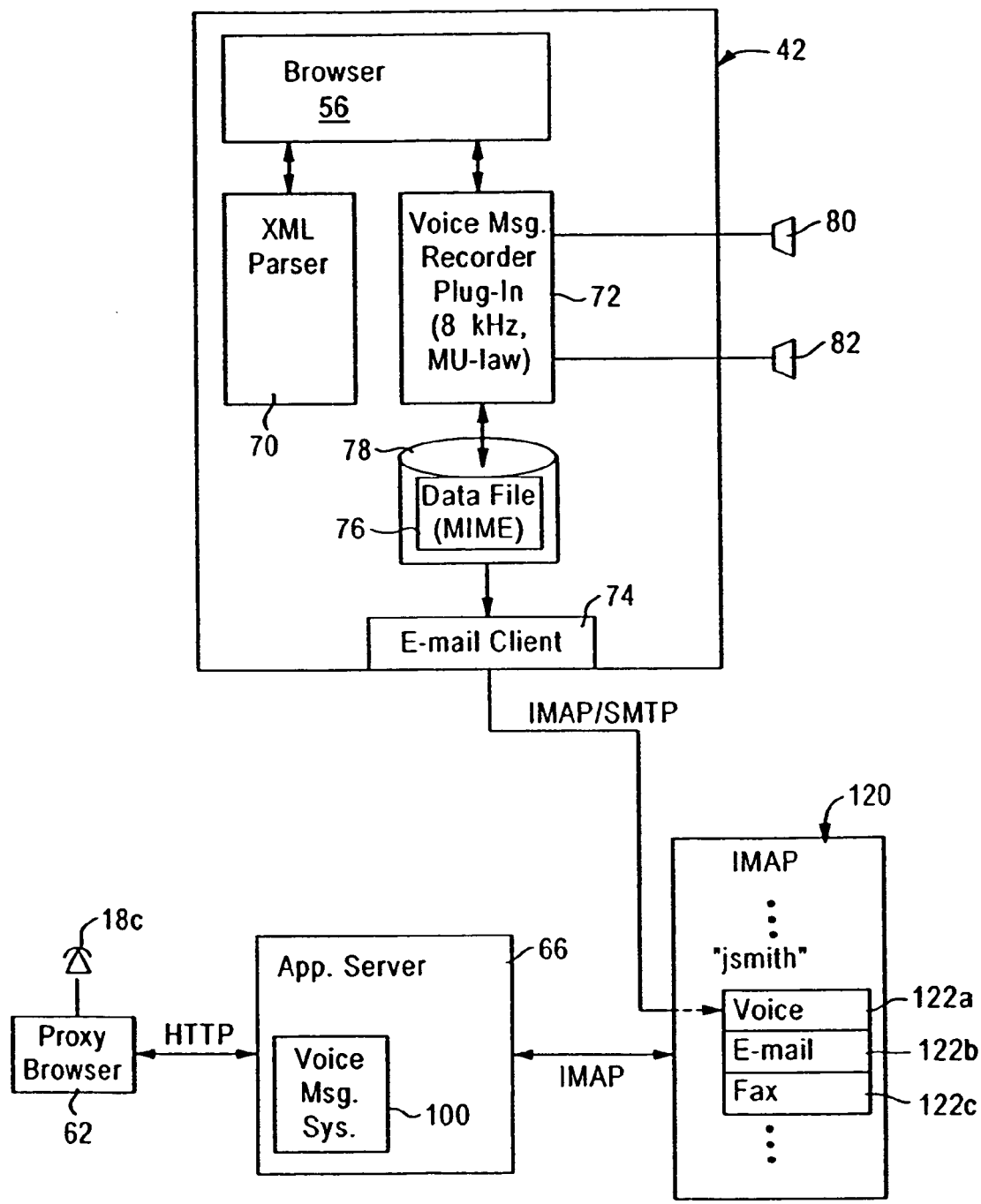
FIG. 2 is a diagram illustrating the user computer of FIG. 1, configured for locally generating a voice message to be sent to a destination voice mailbox for retrieval by the unified messaging system of FIG. 1 according to an embodiment of the present invention.

FIG. 2 is a block diagram illustrating in further detail the user computer (e.g., thin client) 42 configured for sending a voice message for a voice messaging subscriber 18c according to an embodiment of the present invention. As described above, the user computer 42 includes a browser 56 and an XML parser 70 configured for parsing XML tags within a received HTML page during messaging sessions with the application server 66. However, instances may arise where a user of the computer 42 may prefer to leave a voice message without initiating a messaging session with the application server 66, for example if the user computer 42 (e.g., PC laptop) is mobile while the user is traveling; in such a case, the user may prefer are merely to send and receive e-mail messages.

According to the disclosed embodiment, the user computer 42 includes a voice message recorder plug-in 72 as a separate executable resource. The voice message recorder plug-in 72, instantiated by the browser 56, is configured for recording a voice message received via a microphone 80 according to encoding protocols utilized by voice messaging systems 100, for example within the application server 66. For example, voice messaging systems such as voice over IP based messaging systems utilize recognized 8 kHz, mu-law encoding protocols such as G.711, G.729, and GSM. In contrast, conventional PC-based recording systems utilize different encoding formats (e.g., mu-law at 64 kbps) for generation of .wav files. Hence, the voice message recorder plug-in 72 ensures that a voice message is encoded using a protocol compatible with the voice messaging system 100, enabling playback of the encoded voice message by the voice messaging system 100.

In addition, the voice message recorder plug-in 72, and/or the browser 56, are configured for selecting a MIME type that identifies the encoding of the voice message, and generating a data file 76 having the encoded voice message and the selected MIME type. The generated data file 76 is stored on a tangible medium 78, for example a hard disk, enabling the e-mail client 74 to output the data file 76 to a destination voice mailbox 122a of an IMAP-based subscriber message store 120 using IMAP or SMTP protocol. Hence, storage of the data file 76 within the voice mailbox 122a enables the voice messaging system 100 to properly identify the data file 76 as a voice mail message, as opposed to an e-mail attachment.

FIG. 3 is a diagram illustrating the method of sending a voice message to a subscriber message store using a user computer, according to an embodiment of the present invention. The steps described in FIG. 3 can be implemented as executable code stored on a computer readable medium (e.g., a hard disk drive, a floppy drive, a random access memory, a read only memory, an EPROM, a compact disc, etc.).

The method begins in step 200, where the user selects to record a voice message, for example by selecting a command hyperlink in an HTML page displayed on the browser 56. The HTML page may be stored locally within the computer 42, or may be received over the Internet. In response to the user selecting to record a voice message, the browser 56 instantiates (i.e., begins execution of) the voice messaging recorder plug-in 72 in step 202. The voice messaging recorder plug-in 72 selects in step 204 a voice messaging system encoding, for example G.711, G.729, or GSM, for example based on a prescribed setting or based on determining the encoding of a destination subscriber's messaging system. At a minimum, the voice messaging recorder plug-in 72 selects in step 204 one of the messaging system encoding protocols based on default settings.

The voice messaging recorder plug-in 72 begins the recording process in step 206, for example in response to the user pressing a "begin record" command button: the voice messaging recorder plug-in 72 encodes the speech signals received from the microphone 80 based on the voice messaging system encoding selected in step 204, and stores the encoded voice message on the hard disk 78.

The voice messaging recorder plug-in 72 selects in step 208 a Multipurpose Internet Mail Extension (MIME) type based on the selected encoding, and recognizable by the voice messaging system 100. For example, the voice messaging system 100 may use the MIME type extensions ".711", ".729", and ".GSM" for identification of G.711, G.729 and GSM encoding, respectively. The voice messaging recorder plug-in 72 creates in step 210 a data file 76 that includes the stored encoded voice message and the selected MIME type, enabling the voice messaging system 100 to decode and playback the encoded voice message.

The voice message recorder plug-in 72 includes a review/playback option, enabling the user to listen to the recorded voice message before sending the data file 76 to the message store 120. If in step 212 the user selects playback of the message, the voice message recorder plug-in 72 plays back the recorded voice message in step 214 over the speaker 82. Once the user is satisfied with the message, the user can then cause the e-mail client 74 to output in step 216 a message containing the data file 76 for delivery via SMTP or IMAP to the destination voice mailbox 122a of the destination subscriber. For example, the message store 120 may have its own host domain address (e.g., "messagestore.net") with separate address fields identifying the subscriber ("jsmith") and the message type (e.g., "voice"), such that the e-mail address "jsmith@voice.messagestore.net" would be used by the e-mail client 74 to deposit the voice message recorded in the data file 76 into the voice mailbox 122a for the messaging subscriber "jsmith" within the IMAP message store 120 having the host domain address "messagestore.net".

According to the disclosed embodiment, voice messages can be locally generated using a personal computer, and sent via IMAP or SMTP protocol to a message store for a unified messaging system, eliminating the necessity for interactive sessions with the application server 66 to leave a voice message. Moreover, the generation of the data file 76 using an encoding protocol recognized by the voice messaging system 100, and including a MIME type that identifies the encoding format, enables the voice messaging system 100 to play back the stored voice message for the messaging subscriber, as opposed to merely interpreting the data file as an attachment to an e-mail message.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a user computer for sending a voice message, the method comprising:

recording by an executable browser plug-in resource in the user computer a voice message spoken by a calling party based on encoding parameters recognized by a voice messaging system configured for storing voice messages for a plurality of voice messaging subscribers, the user computer distinct from the voice messaging system, the recording including the executable browser plug-in resource encoding the voice message according to a prescribed encoding protocol utilized by the voice messaging system for recording voice messages;

storing by the user computer the voice message within a data file having a selectable Multipurpose Internet Mail Extension (MIME) type recognizable by the voice messaging system as a voice message, the MIME type identifying the prescribed encoding protocol; and outputting from the user computer the data file using a prescribed messaging protocol for transfer to a destination voice mailbox accessible by the voice messaging system for a corresponding one of the voice messaging subscribers distinct from the calling party;

wherein the outputting step includes outputting the data file using an executable e-mail client configured for sending the data file using a prescribed e-mail protocol as the prescribed messaging protocol, and outputting the data file to the destination voice mailbox according to one of SMTP protocol and IMAP protocol.

2. The method of claim 1, wherein the recording step includes recording the voice message using mu-law encoding at an encoding rate of 8 kHz.

3. The method of claim 1, further comprising reviewing the voice message by the executable browser plug-in resource prior to the outputting step.

4. A user computer for sending a voice message, the user computer comprising:

an executable plug-in resource configured for recording a voice message spoken by a calling party according to selected encoding parameters recognized by a voice messaging system configured for storing voice messages for a plurality of voice messaging subscribers, the user computer distinct from the voice messaging system, the executable plug-in resource configured for encoding the voice message according to a prescribed encoding protocol utilized by the voice messaging system for recording voice messages, the executable plug-in resource further configured for storing the voice message within a data file having a selectable Multipurpose Internet Mail Extension (MIME) type recognizable by the voice messaging system as a voice message, the MIME type identifying the prescribed encoding protocol; and the user computer further comprising a messaging resource implemented as an executable e-mail client and configured for sending the data file using a prescribed messaging protocol implemented as a prescribed e-mail protocol from the user computer to a destination voice mailbox accessible by the voice messaging system for one of the voice messaging subscribers distinct from the calling party, enabling access by the voice messaging system for a corresponding one of the voice messaging subscribers distinct from the calling party;

wherein the messaging resource is configured for outputting the data file to the destination voice mailbox according to one of SMTP and IMAP protocol as the messaging protocol.

5. The user computer of claim 4, wherein the recorder is configured for recording the voice message using mu-law encoding at an encoding rate of 8 kHz.

6. The user computer of claim 4, wherein the recorder is configured for enabling the user to review the voice message prior to the messaging resource sending the data file from the user computer.

7. A computer readable medium having stored thereon sequences of instructions for sending a voice message, the sequences of instructions including instructions for performing the steps of:

recording by an executable browser plug-in resource in a user computer a voice message spoken by a calling party based on encoding parameters recognized by a voice messaging system configured for storing voice messages for a plurality of voice messaging subscribers, the user computer distinct from the voice messaging system, the recording including the executable browser plug-in resource encoding the voice message according to a prescribed encoding protocol utilized by the voice messaging system for recording voice messages;

storing by the user computer the voice message within a data file having a selectable Multipurpose Internet Mail Extension (MIME) type recognizable by the voice messaging system as a voice message, the MIME type identifying the prescribed encoding protocol; and outputting by the user computer the data file using a prescribed messaging protocol for transfer to a destination voice mailbox accessible by the voice messaging system for a corresponding one of the voice messaging subscribers distinct from the calling party;

wherein the outputting step includes outputting the data file using an executable e-mail client configured for sending the data file using a prescribed e-mail protocol as the prescribed messaging protocol, and outputting the data file to the destination voice mailbox according to one of SMTP protocol and IMAP protocol.

8. The medium of claim 7, wherein the recording step includes recording the voice message using mu-law encoding at an encoding rate of 8 kHz.

9. The medium of claim 7, further comprising instructions for performing the step of reviewing the voice message by the executable browser plug-in resource prior to the outputting step.

\* \* \* \* \*